US006988146B1

(12) United States Patent
Magret et al.

(10) Patent No.: US 6,988,146 B1
(45) Date of Patent: Jan. 17, 2006

(54) SIMPLE MULTICAST EXTENSION FOR MOBILE IP SMM

(75) Inventors: Vincent Magret, Dallas, TX (US); Laurence Rose, Dallas, TX (US)

(73) Assignee: Alcatel, Paris (FR)

( * ) Notice: Subject to any disclaimer, the term of this patent is extended or adjusted under 35 U.S.C. 154(b) by 559 days.

(21) Appl. No.: 09/702,512

(22) Filed: Oct. 31, 2000

Related U.S. Application Data

(60) Provisional application No. 60/217,909, filed on Jul. 13, 2000.

(51) Int. Cl.
*G06F 15/173* (2006.01)

(52) U.S. Cl. ............... 709/238; 709/238; 709/245; 709/249; 455/433

(58) Field of Classification Search .......... 370/379, 370/338, 331, 352; 709/241, 201, 245; 455/436, 433; 714/4
See application file for complete search history.

(56) References Cited

U.S. PATENT DOCUMENTS

| 5,325,362 A | 6/1994 | Aziz |
| 5,353,412 A | 10/1994 | Douglas et al. |
| 5,537,679 A | 7/1996 | Crosbie et al. |
| 5,561,840 A | 10/1996 | Alvesalo et al. |
| 5,570,366 A | 10/1996 | Baker et al. |
| 5,572,528 A | 11/1996 | Shuen |
| 5,590,126 A | 12/1996 | Mishra et al. |
| 5,754,547 A | 5/1998 | Nakazawa |
| 5,825,759 A | 10/1998 | Liu |
| 5,845,079 A | 12/1998 | Wada et al. |
| 5,862,345 A | 1/1999 | Okanoue et al. |
| 5,926,101 A | 7/1999 | Dasgupta |
| 5,930,248 A | 7/1999 | Langlet et al. |
| 5,949,760 A | 9/1999 | Stevens et al. |
| 6,002,931 A | 12/1999 | Yamaguchi |
| 6,018,573 A | 1/2000 | Tanaka |
| 6,041,358 A | 3/2000 | Huang et al. |
| 6,061,650 A | 5/2000 | Malkin et al. |
| 6,076,109 A | 6/2000 | Kikinis |
| 6,243,758 B1 * | 6/2001 | Okanoue ............... 709/238 |

(Continued)

*Primary Examiner*—Rupal Dharia
*Assistant Examiner*—Djenane Bayard
(74) *Attorney, Agent, or Firm*—Sughrue Mion, PLLC; Jessica W. Smith; Bobby D. Slaton

(57) ABSTRACT

Under Simple Multicast Extension for Mobile IP, when a mobile node arrives at a foreign wireless domain, it listens for an agent advertisement sent by a foreign agent. The foreign agent attaches a network access identifier (NAI) extension to the agent advertisement. The mobile node uses the NAI extension to decide which action to take. If the mobile node determines that it is receiving an agent advertisement message from the same foreign agent it previously was in communication with, no action is required. If the mobile node discovers that it has entered a new foreign domain, it sends a registration request to the foreign agent. If the mobile node identifies that it is still in the same domain but has moved from a previous foreign agent to a new one, it sends a multicast subscription request to the new foreign agent.

If a home agent supports the Simple Multicast Extension for Mobile IP, it allocates a source specific multicast address and inserts the address in a source specific multicast address extension after the registration reply. In addition, tunneling is used to route datagrams from correspondent nodes to the mobile node while the mobile node is in a foreign domain. The destination address of the tunnel is set to the source specific multicast previously allocated. Finally, update messages are used to inform correspondent nodes of a mobile nodes' new location.

18 Claims, 7 Drawing Sheets

WIRELESS DOMAINS TOPOLOGY INCLUDING HOME AND FOREIGN WIRELESS DOMAIN

U.S. PATENT DOCUMENTS

| | | | |
|---|---|---|---|
| 6,477,150 B1 * | 11/2002 | Maggenti et al. | 370/312 |
| 6,522,880 B1 * | 2/2003 | Verma et al. | 455/436 |
| 6,535,493 B1 * | 3/2003 | Lee et al. | 370/329 |
| 6,549,522 B1 * | 4/2003 | Flynn | 370/313 |
| 6,567,664 B1 * | 5/2003 | Bergenwall et al. | 455/403 |
| 6,578,085 B1 * | 6/2003 | Khalil et al. | 709/241 |
| 6,600,743 B1 * | 7/2003 | Lee et al. | 370/390 |
| 6,621,810 B1 * | 9/2003 | Leung | 370/338 |
| 6,625,135 B1 * | 9/2003 | Johnson et al. | 370/332 |
| 2002/0102999 A1 * | 8/2002 | Maggenti et al. | 455/518 |

* cited by examiner

WIRELESS DOMAIN TOPOLOGY

WIRELESS DOMAINS TOPOLOGY INCLUDING HOME AND FOREIGN WIRELESS DOMAIN

MOBILE NODE CONSIDERATIONS

SENDING A REQUEST

HOME AGENT CONSIDERATIONS

HOME AGENT AND CORRESPONDENT NODE CONSIDERATIONS

SIMPLE MULTICAST EXTENSION FOR MOBILE IP SMM

This application claims the benefit of U.S. provisional application No. 60/217,909, filed Jul. 13, 2000.

FIELD OF INVENTION

This invention is related to the field of wireless communication (e.g., cellular networks). More specifically, it relates to registering mobiles and routing packets to and from mobiles in both home and foreign domains.

BACKGROUND OF INVENTION

Recently, there has been an explosive growth of the Internet. This is coupled with the increasing popularity of notebook type computers. The Internet allows users to access huge databases of information. It also provides users with powerful communication tools like e-mail. Furthermore, notebook computers give users the ability to access the Internet anywhere. Consequently, more and more notebook users would like to access the Internet while moving.

Initially, the Internet Protocol (IP) did not contain mobility protocols. As a result, if a mobile host moves without changing its address, it will not be reachable (i.e., packets sent to the mobile host will not be routed correctly. On the other hand, if the mobile host changes its address, it will lose its connections made with the previous address.

Host mobility is not a new concept. Already, there are years of research in this area resulting in several proposals. In 1996, the Internet Engineering Task Force (IETF) has proposed Mobile IP RFC2002 which allows computers to roam freely to other networks while still maintaining the same IP address. Mobile IP is a means for providing location independent routing support to a mobile node by allowing the mobile node to keep the same IP address while changing location. This operation is transparent to the mobile's user. It is intended to enable nodes to move from one IP sub-net to another. Its principle is simple: Mobile IP does not use any physical layers nor does it assume a particular type of physical layer. Therefore, it can operate using many different types of physical layers.

Several special entities have been defined in the Mobile IP architecture proposed by the IETF. The home agent (HA) and the foreign agent (FA) work together to allow a user's mobile node (MN) (or mobile host (MH)) to move freely around the Internet without changing its IP address. Each network that wants to allow its users to roam to another network has a home agent. Every site that wishes to allow visitors has a foreign agent. Any router on a network can serve as a home agent, foreign agent or both. In addition, a user who wants to send packets to the mobile host is called a correspondent node (CN).

When a MN is connected to a foreign network, it uses agent discovery messages to locate a foreign agent that is willing to provide mobility support to the MN while attached to the foreign network. Once a FA is discovered, the MN registers using the registration messages and sends its registration request to the FA. Then, the FA forwards the registration message to the user's home agent, which includes a care-of address, which is typically the foreign agent's IP address. (A care-of address is an IP address allocated to the mobile node's current point of attachment to the Internet if the mobile node is not attached to its home domain).

The HA captures all datagrams sent by correspondent nodes to the MN and encapsulates each datagram sent to the mobile host using the care-of address of the mobile node as a destination of the new datagram. This allows the HA to route the datagrams toward the new FA using a tunnel. The FA decapsulates the incoming datagrams and forwards the original information toward the MN.

Mobile IP (as it was created in 1996) is currently not equipped to handle users moving frequently through large areas with their mobile device connected. Furthermore, the number of MN's requesting roaming in new sub-networks is increasing. For example, people working with their connected PDA while traveling on a bus or a train change sub-networks quiet often. Consequently, the Mobile IP protocol is facing the following problems:

- The mobile may or may not keep on receiving the previous packets coming from the previous sub-network while moving toward a new sub-network, i.e., performing a handoff at the mobile IP level. It depends on the physical layer implementation of radio technologies that is currently being used by the mobile communication system. Mobile IP does not specify usage of a specific physical layer. Thus, while activating the Mobile IP protocol to register the new location of a MN with the HA so that information can be re-routed to the new sub-network, the mobile may lose information still coming to the previous sub-network. This situation is unacceptable for applications requiring "real-time" behavior (e.g. voice over IP applications).
- Mobile IP may not be a scalable solution, since the size of a routing table increases linearly with the number of mobile hosts. In addition, the frequency of updates to it is proportional to the frequency of handoffs in the system.

One solution to these problems is to enlarge the sub-network to minimize the use of the number of registration request messages being sent to the HA by MNs. To this end, the Virtual Private Network (VPN) which creates virtual sub-networks could be used.

Several other protocols such as Seamless IP Multicast Receiver Mobility Support, Multicasting based Architecture for Internet Host Mobility, and Handoffs in Cellular Wireless Networks: the daedalus implementation have been proposed to address these problems. An overview of the design of these protocols is given below.

Seamless IP Multicast Receiver Mobility Support

Introduction

This licentiate proposal "Seamless IP Multicast Receiver Mobility Support" specifies a mobility support agent (MSA) protocol which provides a mechanism to help ensure seamless reception of IP multicast traffic despite a mobile node's handoff. This is possible because in advance of its handoff, a mobile node pre-registers with the MSA agent on the next network to be visited. Unlike the present invention, "Seamless IP Multicast Receiver Mobility Support" is not intended to enhance the Mobile IP protocol, but to be used in parallel with it. Furthermore, it would perform a handoff in the unique case of a mobile host already receiving multicast traffic.

Terminology Used

The terminology used in "Seamless IP Multicast Receiver Mobility Support" is basically the same as that used in Mobile IP. Additional terminology defined in "Seamless IP Multicast Receiver Mobility Support" includes:

Visiting network:
: The IP sub-net that the mobile node is currently visiting.

Neighboring network:
: An IP sub-net that is geographically a neighbor of the visiting IP sub-net.

Next network (to be visited):
: The IP sub-net that that the mobile node will be connected to (i.e., to which it is handed over to).

Previous network—i.e. Previously visited network:
: The IP subnet that the mobile node has just visited.

Principles

When a mobile node has subscribed to a multicast session and is about to perform a handoff, there is a probability that the roaming sub-network is not yet receiving the multicast traffic. It is assumes that many multicast sessions will be sparse mode sessions, in which members are scattered over the Internet. Therefore the "latency" incurred performing a handoff is at least the time the router takes to poll an Internet Group Management Protocol (IGMP) "membership query" which is 120 seconds maximum. (See Internet Group Management Protocol, Version 2, W. Fenner, Xerox Parc, RFC 2236, November 1997). In addition, the time the mobile takes to answer with an IGMP "membership report" adds another 10 seconds maximum. Another IGMP possibility would to send an unsolicited IGMP "membership report" to avoid waiting for the IGMP polling, but this is not possible since neither the multicast applications, nor IGMP, has a mechanism to detect the mobile node handoff.

The MSA architecture introduces a new architectural entity:

Mobility Support Agent (MSA):
: An agent on a network which acts as a proxy for mobile nodes to establish the multicast tree in advance of the mobile nodes' arrival. In addition, this agent can also be used to advertise the services available on its sub-network to the mobile nodes.

The MSA Architecture Introduces New Control Messages:

1) Agent Discovery Protocol:

The Agent Discovery protocol is used to advertise the presence of MSAs and their services. Unlike Mobile IP [RFC2002], mobile nodes do not use MSA agent discovery protocol to determine its current location or to detect the node's movement. With the MSA architecture, movement can be detected with the help of Mobile IP or by using link layer mechanisms.

a) Inter-Agent Advertisement Message:

A group of cooperating MSAs forms their own multicast group to advertise their availability and services to each other. The address of the multicast group can either be an administrative multicast address or other pre-defined addresses.

b) Agent-MN Advertisement Protocol:

The Agent-MN advertisement makes use of the Mobile IP agent advertisement extensions of the ICMP router advertisement. Advertisement messages are transmitted by a MSA to the mobile nodes that are on the same network. The information advertised by the MSA is either directly retrieved from the Inter-agent Discovery messages, or derived from them.

i) Neighboring Network Extension

2) Pre-Registration Protocol:

a) Pre-Registration Message

In advance of performing the handoff, the mobile node pre-registers with the MSA on the next network. Based on this pre-registration the MSA, establishes the multicast tree and negotiates for services (as a proxy of the mobile node).

b) Registration Confirm Extension

The mobile node sends the confirmed registration (Registration Confirm) to the MSA only after it has moved to the next network and successfully received the first multicast datagram.

3) De-Registration Protocol:

a) De-registration message

After moving to another network, a mobile node de-registers with the MSA on the previous network. De-registration explicitly removes stale states which might otherwise lead to unnecessary traffic being sent to the previous network.

Sequence of Operations

MSAs advertise their presence and services (bandwidth reservation, authentication, etc.) via agent advertisements. A mobile node may optionally solicit an agent advertisement from any locally attached MSAs through an agent solicitation.

A mobile node about to make a handoff chooses one or more most-likely next networks (perhaps via a movement prediction algorithm) and sends pre-registration (s) to the MSA on what are the potential next network (s).

After authentication, and following negotiation between the mobile node and each of these MSAs, these MSAs can now act as a proxy for the mobile node in setting up the requested multicast sessions. IGMP messages are exchanged between the MSA and its directly attached multicast routers.

As soon as the mobile node arrives at the next network, it resumes receiving the IP multicast traffic with minimal possible latency, since the join occurred even before it arrived.

Multicasting Based Architecture for Internet Host Mobility 1.1.1 Introduction

This proposal uses IP multicasting as a mechanism to achieve mobility. Every mobile node is issued a multicast address instead of a unicast address. In addition, there is no concept of home agent/foreign agent. The multicast address is used along with location servers and multicast routers to achieve mobility. It is not a solution to the problem of micro-mobility. Instead, it is protocol that challenges Mobile IP.

Terminology

Location Server (Distributed Directory): These are servers that store bindings between the multicast address of a MN and the multicast router (MR) serving the MN. Each MN is responsible for periodically updating its location server with information on the multicast router serving it.

Base Station (BS): In addition to the normal capabilities of the base station, in this scheme each base station also has the capability of working as a multicast router.

Sequence of Operations

When a correspondent node sends a datagram intended for a MN (having a multicast address), the multicast router serving the correspondent node (MR_CN) within the network picks up the datagram and checks a location server for information regarding the MN. The location server chosen depends upon the multicast address of the MN.

On obtaining the address of the multicast router (MR_MN) that serves the MN, the MR_CN contacts the MR_MN and joins the multicast group. In addition, it forwards the datagram. Each MR that receives the datagram, de-tunnels the datagram and forwards it to the MN. Before the MN moves from the coverage of one multicast router to another, the MN requests the MR within the new network to join the multicast group. Therefore, the MN receives an uninterrupted flow of packets when it changes coverage. As a result, both the previous MR and the new MR of the MN receives the packets for a short overlap time period.

Handoffs in Cellular Wireless Networks: the Daedalus Implementation, International Journal on Wireless Communication Systems Introduction Wireless data networks are usually composed of a wired, packet-switched, backbone network and one or more wireless (e.g., cellular radio or infrared) hops connecting mobile hosts to the wired part. The wireless part is organized into geographically defined cells, with a control point called a base station (BS) for each of these cells. The base stations are connected to the wired network and function as a bridge for communication between the wireless infrastructure and the Internet. As a mobile host (MH) travels between wireless cells, the task of routing data between the wired network and the MH is transferred to the new cell's base station. This process, known as a handoff, maintains end-to-end connectivity in the dynamically reconfigured network topology.

This proposal presents a handoff protocol that achieves latencies between 30 to 40 ms or less. In addition, there is no data loss in the case of handoffs between base stations that are topologically close to each other. This protocol uses both multicast for fast route updates and intelligent buffering at the base stations. However, "Handoffs in Cellular Wired Networks" is not intended to be used with Mobile IP, but to challenge it.

Terminology

The terminology used in "Handoffs in Cellular Wireless Networks" is basically the same as that used in Mobile IP. Additional terminology includes:
  Mobile Host: a mobile node as defined in Mobile IP.
  The Encapsulator: a software entity located in the home agent that performs the encapsulation and forwarding of IP packets destined for the mobile host to its current location.
  The Route Analyzer: a software entity located in the mobile host that uses the information provided by the beacon system to configure the routes taken by packets.
  The Decapsulator: A software entity located in the base station that decapsulates and either forwards packets across the wireless link to the mobile host or buffers them.

Principles

Each MH is assigned a temporary IP multicast address. The home agent encapsulates packets destined for the MH and forwards them to its associated multicast group. The members of this multicast group include the base stations in the vicinity of the mobile host, but the mobile host itself does not join the group. The BS responsible for the cell containing the MH joins the IP multicast group. At any instant of time, there is at most one primary BS in the system for a given mobile host.

In addition, in each MH an entity called the route analyzer keeps track of the recent beacons it has received to approximate its current location and motion. The MH uses statistics such as the received signal strength of the beacons and communication quality of the beacons to identify which BSs are nearby. Thus, BSs that are identified as likely handoff targets are asked to join the multicast group by the MH. These BSs do not forward the packets from the multicast group to the wireless network. Instead, they buffer the last few packets transmitted from the HA. When a MH enters such a cell, the new primary BS begins transmitting packets from its buffer of packets. This approach does not define a regional concept where handoffs are supposed to occur smoothly with fewer overheads than handoff between different regions.

1.1.2 Sequence of Operations

When a mobile host leaves its normal home location, it initializes the home agent encapsulation by specifying a predefined multicast address corresponding to it. The home agent entity called the encapsulator intercepts all packets destined for the mobile host. It encapsulates and forwards the packets to their associated multicast address.

The route analyzer for the mobile host requests one or more decapsulators in its vicinity to receive packets. Thus, the requested base stations join the IP Multicast group associated with the mobile host and receive packets intended for the mobile host. The route analyzer uses the information provided by the beacon system to choose a single base station in its area to be the current forwarding base station (the primary base station). In addition, other base stations that are likely targets for handoff listen on the mobile host's multicast group and buffer incoming packets. The mobile host itself does not join the multicast group.

The decapsulator for the primary base station decapsulates and forwards packets across the wireless link to the mobile host. The other base stations that receive packets for the mobile host do not forward them on. Instead, they buffer the last few packets received. The base station entity called the decapsulator scans all multicast packets to identify the ones that are destined for a registered mobile host. It then processes the packet based on the current state of decapsulation (either primary forwarding or nearby buffering) for the mobile host.

During the change to forwarding state, the base station forwards to the mobile host any packets that were stored while the decapsulator was in buffering mode and have not yet been delivered to the mobile host. This eliminates any loss of packets en route to the mobile during handoff. To identify which packets to transmit from the buffer, the MH passes the IP IDs of the last three packets received by it and packets after these are transmitted. Once the mobile host leaves the cell, the decapsulator returns to the buffering state. Finally, the route analyzer asks to delete the decapsulation entry from the base station and has the base station leave the associated IP Multicast group.

The protocols discussed above have some drawbacks.
  The "Seamless IP Multicast Receiver Mobility Support" does not describe how the mobile node obtains the multicast address. In addition, it does not address possible conflict when two mobile nodes use the same multicast address. Furthermore, the protocol described works independently of Mobile IP [RFC2002]. This is a major drawback because Mobile IP provides a delivery mechanism for Multicast packets. On the plus side, "Seamless IP Multicast Receiver Mobility Support" enhance the efficiency of handoffs.
  The "Multicasting based Architecture for Internet Host Mobility" proposal has several drawbacks. There is a limitation in the number of unique class D addresses that can be assigned to each and every MN in IPv4. Furthermore, it requires that every router in a sub-network be mobility-aware because the multicast router located near each correspondent needs to be able to find the location server to tunnel the datagram. Before a MN moves under a new coverage, it can inform the MR within that area of a possible handoff and request the MR to join the multicast group. Therefore, the MN has to know the address of the neighboring MR, and also the overhead that is involved at the MN every time it performs a handoff. Furthermore, the scalability of using a location server is something that is not very clear.

The "Handoffs in Cellular Wireless Networks: the daedalus implementation" proposal does not describes which entity in the network allocates the multicast address. Furthermore, it does not deal with the problem of simultaneous usage of the same multicast address. The proposed protocol also implies that the mobile node save the last three packets to help the base station in the decision process of which packets are to be retransmitted.

SUMMARY OF THE INVENTION

In a preferred embodiment, the invention is a method and apparatus for routing data to a mobile node in both home and in foreign domains using the following methodology. A foreign agent sends an advertisement message to a mobile, which contains an indicator about the foreign agent's capability to support the proposed invention. The mobile node sends a request to the foreign agent. The request is a registration request if the mobile has entered a new foreign domain. The foreign agent relays the registration request to a home agent. The home agent inserts a multicast address in a source specific multicast address extension and appends the extension to a registration reply. The mobile node receives the registration reply along with the attached source specific multicast address extension.

In another preferred embodiment, the request is a multicast subscription request if the mobile has remained in the same foreign domain, but has moved to a new foreign agent. In addition, the mobile node also sends a MN-FA authentication to the foreign agent.

In still another preferred embodiment, the invention is a method and apparatus for updating location in a communication system using the following methodology. A home agent sends a binding update to a correspondent, informing the correspondent of the mobile node's multicast address. The correspondent sends an acknowledgement back to the home agent. The home agent then sends a source update to the mobile node, informing the mobile that said correspondent has received the binding update with the multicast address.

In still another preferred embodiment, the invention is a method and apparatus for tunneling data in a communication system using the following methodology. A home agent intercepts packets sent to a mobile node from a correspondent node when said mobile node is visiting a foreign wireless domain and tunnels the packets using a multicast address. A foreign agent forwarding said packets to said mobile node and the mobile node detunnels the intercepted packets.

In yet still another preferred embodiment, the invention is a method and apparatus for routing data to a mobile, comprising a mobile node, at least one foreign node operably connected to the mobile, wherein the foreign agent comprises a visitor list, and a home agent operably connected to the mobile node. The home agent has a binding list having at least one entry for the mobile node. The entry includes the mobile node's multicast address and a remaining lifetime of a registration. In addition, a tunnel can be operably connected to either the correspondent or to the home agent, whereby a multicast address can be used to tunnel data packets.

DETAILED DESCRIPTION OF THE INVENTION

Figure 1:
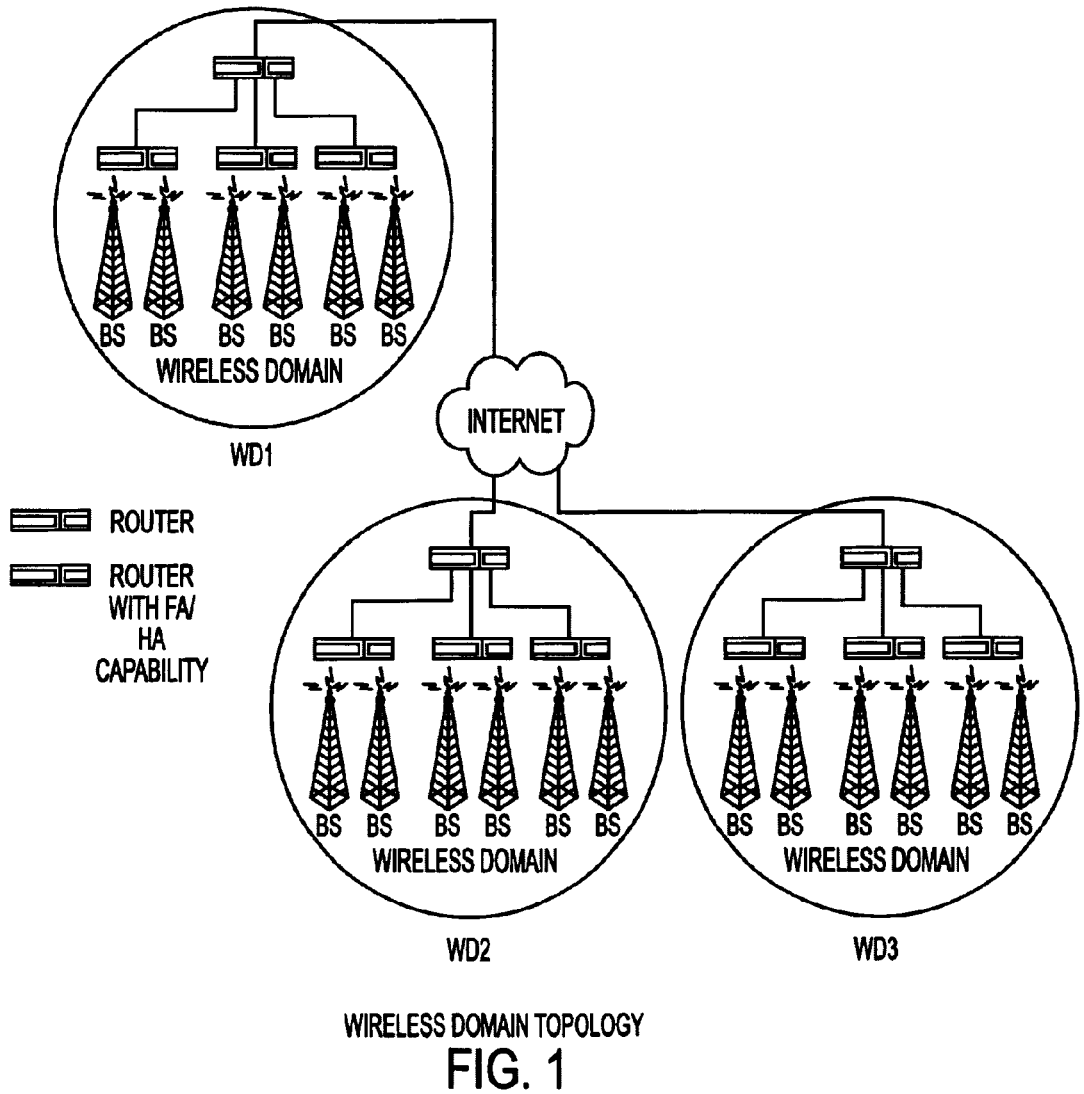
FIG. 1 illustrates the wireless domain topology.

The Simple Multicast Extension for Mobile IP (SMM) is more than a modification in the Mobile IP protocol principle. Instead, it represents an improvement since it uses extensions inside the Mobile IP. As a result, SMM is almost completely transparent to the mobile node because it has to only remember its multicast address and join the multicast group while performing a handoff.

Make Before Break

In a preferred embodiment, the present invention can support a "make before break" scheme if the SMM protocol is associated with a "movement detection" mechanism. Under the "make before break scheme," a new circuit (or path) to the mobile is created before breaking the old one. This principle is useful for voice communication. Having such a feature is an advantage over existing systems. Furthermore, it can work with existing "movement detection" mechanisms commonly used, like the beacon detection. Also, it can work with the "make before break" principle used in the Global System for Mobile (GSM) communication networks. Basically, this principle allows the creation of a new circuit (or path) going to the mobile before breaking the old one. This principle is useful for voice communication. Having such a feature gives a great advantage to the present invention. This should be used along with an adequate MN or a FA methodology to avoid the reception of duplicate packets because multiple inscriptions to the same source subscription multicast (SSM) channel are possible for the same MN.

Latency

Using the Simple Multicast Extension to Multicast IP within a wireless domain, the mobile node can move from one foreign agent to another with reduced latency compared to regular Mobile IP. That is, the time that the system needs to perform a handoff between two foreign agents is reduced. (A foreign agent is an agent on the foreign network that assists the mobile in receiving datagrams delivered to the care-of address. See *Mobile Networking Terminology*, Charles E. Perkins, Internet-computing@computing.org, IEEE Internet Computing Online 1997). Indeed, in Mobile IP when performing a handoff, the mobile node needs to re-register with its home agent, which can be located anywhere on the Internet. Therefore, the time to register will be increased. In addition, the foreign agent will have to initiate an authentication procedure for the mobile node, also increasing the latency. With the present invention, the mobile node simply sends a multicast subscription request message along with a MN-FA authentication extension. Therefore, the process of registering with a new foreign agent is reduced.

In addition, the time need to deliver packets to the mobile node is also reduced. In a preferred embodiment, SMM relies on multicast routing. Since the new foreign agent will probably be located in the vicinity of the previous foreign agent, the time required to construct a multicast tree will be shortened.

SMM allows reuse of a source specific multicast address due to the fact that the address of the home agent serving the mobile node is unique in the Internet. The source specific multicast address provides this advantage by avoiding the inter-host coordination when choosing the multicast address. Another advantage provided by SMM is that it provides strong security features. In a preferred embodiment, SMM requires the use of source specific multicast addresses and requires that the Internet support source specific multicast routing.

Terminology

The terminology used in SMM is basically the same as that used in Mobile IP. Additional terminology defined in SMM includes:

Wireless domain (WD): The domain via which the user gains access to the Internet. The domain needs to be managed by a single entity for security and authorization reasons.

Home wireless domain (HWD): The wireless domain in which the home agent of a mobile node is located.

Foreign wireless domain (FWD): A wireless domain in which a mobile node does not have a home agent.

Base station (BS): This is the end point of the wired network. It has an air interface.

Several base stations may be linked to the same FA.

Cell: It is the area covered by a base station.

Source specific multicast (SSM): Source specific multicast introduces the concept of a channel, which links the group address to a set of specific sources. The range from 232.0.0.0 to 232.255.255.255 is reserved for source specific multicast. This is further described in IETF draft *Source-Specific Multicast for IP*, H. Holbrook, B. Cain, IETF March 2000, work in progress.

The present invention is a simpler and much more scalable solution to the problems of lost data and latency than the above mentioned protocols. The Simple Multicast Extension to Multicast IP takes advantage of the domain concept and the topology of the domain (which is usually tree-like). It uses multicast to route datagrams to the mobile node. This novel and unobvious method and apparatus is fully compliant with the Mobile IP protocol. Furthermore, it defines an extension to it. As a result, it avoids both lost information and latency during handoff in the micro-mobility field.

Overview

Figure 2:
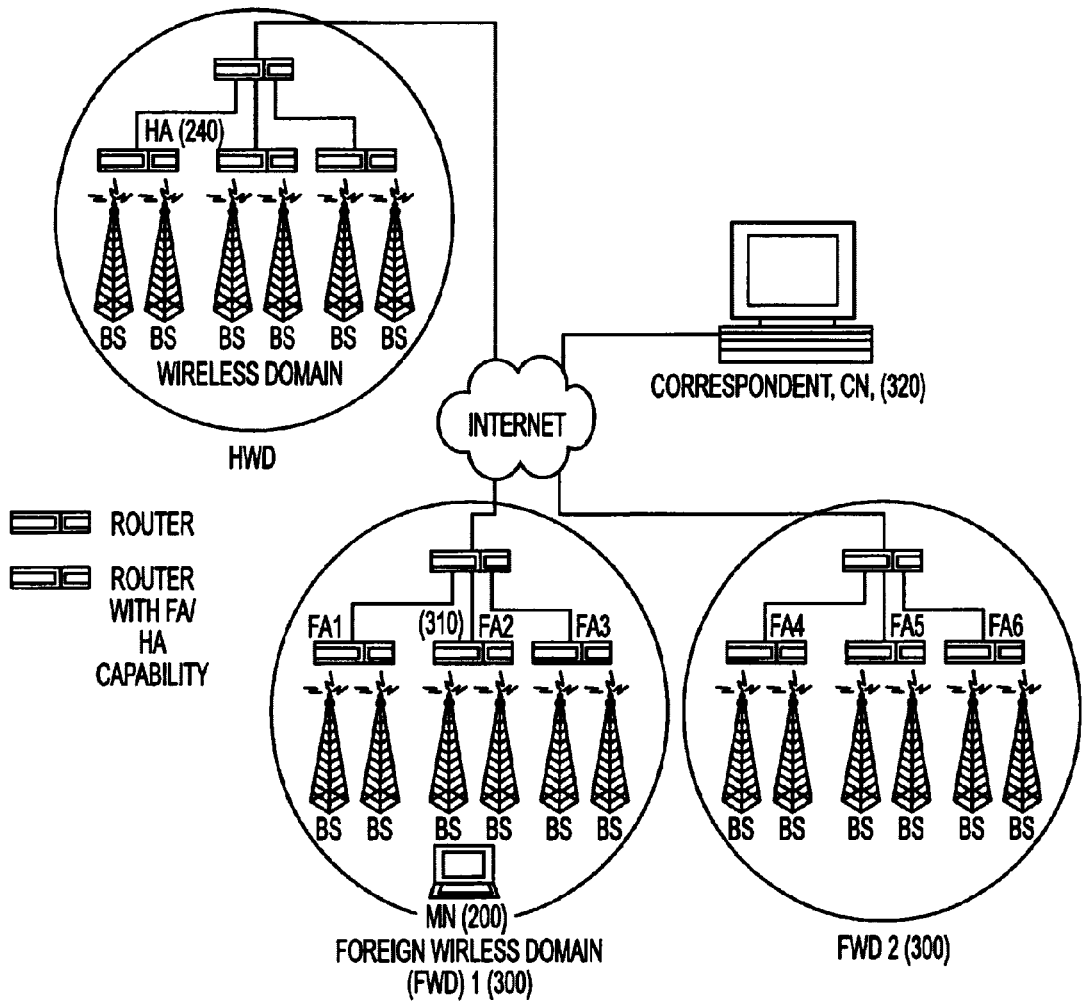
FIG. 2 illustrates the wireless domain topology including home and foreign wireless domains.

FIGS. 1 and 2 illustrate an embodiment in which the present invention can be used. In FIGS. 1 and 2, several wireless domains (WD1, WD2 and WD3) are connected to the Internet. In a second preferred embodiment, the present invention can also be applied to the case where a single home wireless domain exists (i.e. a corporate network) in which users can move from one point of attachment to another.

As discussed infra, the terms FA, HA and MN are defined in the Mobility Internet Protocol, *IP mobility support*, Charles Perkins (Editor), RFC 2002, October 1996, hereby incorporated by reference. (Also, pending U.S. application Ser. No. 09/602,712, Micromobility Using Multicast, Filing Date Jun. 26, 2000, First Named Applicant Vincent Magret, is hereby incorporated by reference).

Mobile IP [RFC2002]; *IP mobility support*, Charles Perkins (Editor), RFC 2002, October 1996 provides a framework wherein mobile nodes (or mobile hosts or mobiles) can move from one point of attachment (e.g. a sub-network in an enterprise) to another point of attachment (e.g. another sub-network in another enterprise) and still be able to communicate with other nodes. The reason mobile IP can do this is because it provides the means to keep track of the current location (called a binding in the Mobile IP specification [RFC2002], and have all the traffic forwarded to the mobile node's current location transparently. Whenever the mobile node moves from one sub-network to another, its location is updated by updating the tracking (i.e. the binding) which is maintained in its home network (e.g. the network in which the user is officially registered).

Micromobility using Multicast (pending U.S. application Ser. No. 09/602,712, filed Jun. 26, 2000) is a method and apparatus for registering a mobile node in both home and in foreign domains. A base station informs a base station router of the presence of a mobile entering the base station's coverage area by sending a mobile node advertisement message to a base station router. In addition, the mobile node sends a mobile IP registration request to the base station router. The base station router appends a base station router extension message to the mobile IP registration request (which contains an IP address of the base station router) and forwards the mobile IP registration request to a main access router. The main access router appends a multicast address extension to the mobile IP registration reply. The multicast address extension contains the multicast address allocated for the mobile node. Furthermore, the base station router sends a neighbor update message to other base station routers. The neighbor update message contains a list of mobile nodes currently located under the base station router's coverage area. In addition, the invention is also a method and apparatus for sending packets to a mobile node in both home and foreign domains. It uses tunnels to route the packets to a multicast group comprised of base station routers. The neighboring base station routers not currently serving the mobile node filter and discard the packets.

The introduction of the Simple Multicast Extension for Mobile IP (SMM) improves some aspects of the behavior of each entity. For example, SMM defines extensions which improve the current Mobile IP protocol. These improvements include:

Allowing the foreign agent to advertise its capability by setting a specific bit (or flag) in the agent advertisement message.

Allowing the mobile node to request the HA to allocate a source specific multicast (SSM) address and to encapsulate all its destined packets using this SSM address as defined in *Source-Specific Multicast for IP*, H. Holbrook, B. Cain, IETF March 2000, work in progress.

Allowing the HA to grant the request, allocate a SSM address and send it back to the MN. Also, the HA can deny the allocation.

Allowing the HA to send the source specific multicast address to a correspondent node so that the triangle route problem can be avoided. As a result, the correspondent node can encapsulate data packets using the source specific multicast address and send them directly to the mobile node.

Allowing the HA to send the source address of the correspondent node to the mobile node so that the mobile node can modify its channel subscription by adding the new source address (i.e. the correspondent's address).

Allowing a secured subscription mechanism to a channel (i.e. combination of a source unicast address and a SSM address). As a result, a new message is created to increase the security level of a subscription procedure. In a preferred embodiment, a message defined in the IGMP protocol (Internet Group Management Protocol, Version 2, W. Fenner, Xerox Parc, RFC 2236, November 1997) can be used. In addition, the foreign agents should turn off their IGMP support.

Simple Multicast Extension for Mobile IP improves and extends the mobile IP to offer micro-mobility support. In a preferred embodiment, the Simple Multicast Extension for Mobile IP makes the assumption that there is a single operator managing the foreign network (or foreign wireless domain) and that the networks between the HA and the MN are multicast enabled. (A foreign network is a network to which the mobile is attached to when not attached to the home network and on which the care-of address is reachable from the rest of the Internet. A home network is a network at which the mobile node appears reachable to the rest of the Internet because of its assigned IP address). Under the present invention a given mobile node has a static home agent within its home network or home wireless domain. When the mobile node arrives at a foreign network 300 or foreign wireless domain 300, it listens 400 for an agent advertisement sent 330 by a FA 310. If the FA 310 uses the agent advertisement to advertise its capability to support the Simple Multicast Extension for Mobile IP, the FA inserts (or attaches) a network access identifier extension to the agent advertisement.

Network Access Identifier Extension (NAI)

The MN 200 uses (or analyzes) the network access identifier extension (NAI) to decide which action to take. The MN 200 memorizes the NAI of the previous FA (e.g. previous_FA@wireless_domain.com) and compares it to the new NAI received 410 (e.g. new_FA@wireless_domain.com). In a preferred embodiment, the MN 200 has three possible courses of action. First, if both NAI are identical 420, then the MN 200 determines that it is receiving an agent advertisement message from the same FA 310. Thus, no action is required 430, except if the lifetime of the registration is close to expiration. In this case, the mobile node sends a registration request as defined in Mobile IP RFC 2002.

Second, if the MN 200 discovers that it has entered a new foreign domain 440, it sends a registration request to the foreign agent 450. Furthermore, if the MN 200 chooses to request service from its home agent 240, it sets a simple multicast flag (or flag) in its registration request 450.

Third, if the mobile node 200 identifies that it is still in the same domain but has moved from a previous FA 310 to a new one, it sends a multicast subscription request to the new FA 460.

If the home agent 240 supports the Simple Multicast Extension for Mobile IP, it allocates a source specific multicast address 610 and inserts the address in the source specific multicast address extension (or multicast address extension or address extension) after the registration reply 620. Upon receiving the registration reply along with the attached source multicast address extension, the MN 200 then subscribes to the SSM channel formed by associating the home agent address and the source specific multicast address contained in the source specific multicast address extension.

Updates

A binding update message is used to inform correspondent nodes 320 of the mobile node's 200 new location. In a preferred embodiment, the home agent 240 sends a binding update message 710 to a mobile node's correspondent 320 in three situations:

In response to a binding warning message 720 sent by the mobile node 200.

In response to a binding request message 730 sent by a correspondent 320.

In response to a binding request message 700 sent along with a registration request message.

In response, a correspondent node 320 that has successfully received a binding update (or binding update message) will send a binding acknowledgement to the home agent 740 if the acknowledgement bit was set in the binding update message. The home agent 240 should send a source update message to the mobile node after receiving a binding acknowledgement from the correspondent 750.

Tunneling

In another preferred embodiment, tunneling is used to route datagrams from correspondent nodes 320 to the mobile node 200 while the mobile node 200 is in a foreign domain 300. (Tunneling is the technique by which datagrams are sent into the payload of a protocol of the same layer (e.g., IP layer). For example, tunneling occurs when an IP packet is put into another IP packet). The home agent 240, as in Mobile IP, intercepts packets sent by correspondent nodes 320 to the mobile node 200 while it is visiting a foreign wireless domain 300 and tunnels them to the MN 200. The destination address of the tunnel is set to the source specific multicast previously allocated. The mobile node 200 then de-tunnels the packets sent by the home agent 240.

Sections describing the behavior of the entities involved in this SMM follow this section: the mobile node, foreign agent, the home agent and the correspondent node.

New Packet Formats

The following is a description of the format of the messages used in SMM.

Mobility Agent Advertisement Extension

Usage: In the Simple Multicast extension for Mobile IP, the "Mobility Agent Advertisement Extension" (or advertisement message) is used by a Mobility Agent to advertise its capacity to support SSM service.

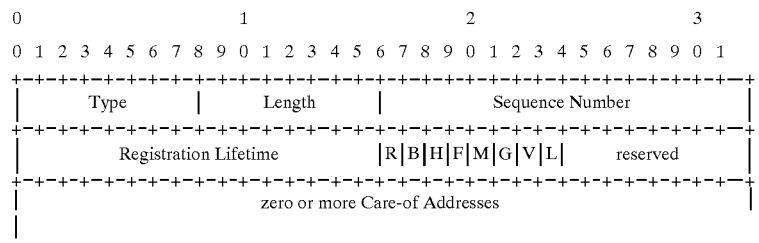

L: Source Specific Multicast bit. Simple Multicast extention for Mobile IP defines this bit to indicate that this mobility agent supports SSM service.

All other fields keep their meaning as defined in mobile IP [RFC 2002].

Network Access Identifier Extension

Usage: the network access identifier extension (or identifier) is sent along with the agent advertisement message if the FA supports Simple Multicast Extension for Mobile IP.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Type     |     Length    |            FA-NAI    ...
+-+-+-+-+-+-+-+-+-+-+-+-+-+-+-+-+-+-+-+-+-+-+-+-+-+-+-+-+-+-+-+-+
```

Type: TDB

Length: the lenth in bytes of the FA-NAI field

FA-NAI: A string in the NAI format as defined in the NA1 specification, The Network Access Identifier, B. Aboda, Microsoft Corporation, M. Beadles, WorldCom Advanced Networkds, RFC 2486, January 1999.

Registration Request

Usage: The Mobile IP "registration request" is set as defined in Mobile IP [RFC 2002]. If the foreign or mobility agent has advertised its capacity to support SSM, the mobile node may use the source specific multicast bit in the Mobile IP "registration request" to request SSM service from the home agent.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Type     |S|B|D|M|G|V|L|P|           Lifetime            |
+-+-+-+-+-+-+-+-+-+-+-+-+-+-+-+-+-+-+-+-+-+-+-+-+-+-+-+-+-+-+-+-+
|                         Home Address                          |
+-+-+-+-+-+-+-+-+-+-+-+-+-+-+-+-+-+-+-+-+-+-+-+-+-+-+-+-+-+-+-+-+
|                          Home Agent                           |
+-+-+-+-+-+-+-+-+-+-+-+-+-+-+-+-+-+-+-+-+-+-+-+-+-+-+-+-+-+-+-+-+
|                        Care-of Address                        |
+-+-+-+-+-+-+-+-+-+-+-+-+-+-+-+-+-+-+-+-+-+-+-+-+-+-+-+-+-+-+-+-+
|                                                               |
+                         Identification                        +
|                                                               |
+-+-+-+-+-+-+-+-+-+-+-+-+-+-+-+-+-+-+-+-+-+-+-+-+-+-+-+-+-+-+-+-+
|   Extensions  ...
+-+-+-+-+-+-+-
```

L: source specific multicast bit. In Simple Multicast Extention for Mobile IP, this bis indicattes the mobile node's request to have its home agent assign and use a SSM address.

P: The private ('P') bit is set by the node sending the bidning reqquest message to indicate that the home agent should keep its mobility binding private. In any binding update message sent by the mobile node's home agent, the care-of address should be set equal to the mobile node's home address, and the lifetime should be set equal to 0. This bit is defined in draft-ieft-mobileip-optim-09.txt.

All other fields keep their meaning as defined in mobile IP [RFC 2002].

Registration Reply

Usage: The Mobile IP "registration reply" is set as defined in Mobile IP [RFC2002].

1. If the SSM service is supported by the home agent, and if the home agent does succeed the SSM address allocation as indicated in the Mobile IP "registration request", the registration reply code value is set to 0. The Simple Multicast extension for Mobile IP "source specific multicast address extension" is added (or attached) at the end of the registration reply.
2. If the home agent supports SSM service, and if the home agent does not succeed the Mobile IP "registration request" SSM address allocation, the CODE option is set to 3. From now on, Mobile IP [RFC 2002] is used.
3. If the home agent does not support the SSM service, the CODE option is set to 2. From now on, Mobile IP [RFC 2002] is used.

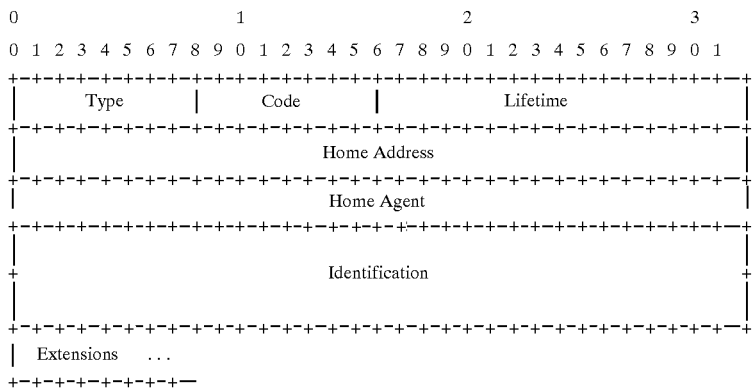

Code: Simple multicast extension for Mobile IP introduces four new codes:
- 2: registration successful but SSM not supported by the home agent. This code means that the mobile node is registered using Mobile IP as defined in [RFC 2002].
- 3: registration successful but SSM not available (i.e. the home agent may support a limited number of (SSM addresses). This code means that the mobile node is registered using Mobile IP as defined in [RFC 2002].
- 89: the foreign agent does not support SSM.
- 90: Source Specific Multicast Address not present in the home agent registration reply.

Source Specific Multicast Address Extension

Usage: the "source specific multicast address extension" is appended at the end of the home agent's Mobile IP "Registration Reply" and contains the source specific multicast (SSM) address allocated for the mobile node.

Type: TBD

Multicast address: the SSM addres assigned for the mobile node. The information related to the mobile is attached to the mobile IP registration reply. The SSM address extension is appended at the end of the mobile IP registration reply.

Multicast Subscription Request

Usage: The MN sends the multicast subscription request (or multicast request) after detecting that it has moved from one FA to another, but both FAs belong to the same wireless domain. The message requests the FA, which acts as a router for the MN, to deliver the datagram sent to the specified channel (i.e. combination of a source address, and a source specific multicast address). In addition, the subscription contains a lifetime, which indicates the maximum duration of the service. If the FA does not receive a refreshing registration request, the FA will stop delivering the datagram. The multicast subscription request is accompanied with a MN-FA authentication as defined in section 3.5.3 of Mobile IP[RFC 2002]. As in IGMP *Internet Group Management Protocol, Version 2*, W. Fenner, Xerox Parc, RFC 2236, November 1997, the subscription to a channel or multicast group is unsecured. This message increases the security level because the message is sent along with a MN-FA authentication.

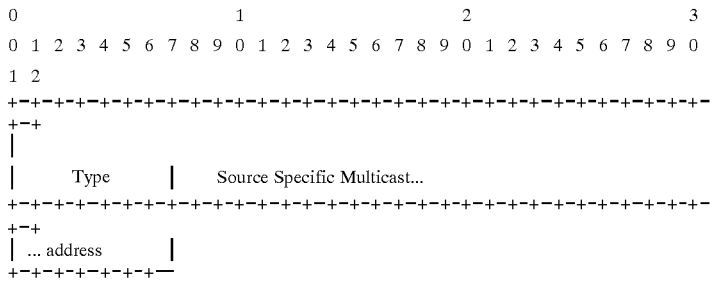

```
0                   1                   2                   3
0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      Type     |    counter    |            Lifetime           |
+-+-+-+-+-+-+-+-+-+-+-+-+-+-+-+-+-+-+-+-+-+-+-+-+-+-+-+-+-+-+-+-+
|                   Source Specific Multicast Address           |
+-+-+-+-+-+-+-+-+-+-+-+-+-+-+-+-+-+-+-+-+-+-+-+-+-+-+-+-+-+-+-+-+
|                          Source Address 1                     |
+-+-+-+-+-+-+-+-+-+-+-+-+-+-+-+-+-+-+-+-+-+-+-+-+-+-+-+-+-+-+-+-+
|                               ...                             |
+-+-+-+-+-+-+-+-+-+-+-+-+-+-+-+-+-+-+-+-+-+-+-+-+-+-+-+-+-+-+-+-+
|                          Source Address n                     |
+-+-+-+-+-+-+-+-+-+-+-+-+-+-+-+-+-+-+-+-+-+-+-+-+-+-+-+-+-+-+-+-+
|                                                               |
|                                                               |
+                          Identification                       +
|                                                               |
|                                                               |
+-+-+-+-+-+-+-+-+-+-+-+-+-+-+-+-+-+-+-+-+-+-+-+-+-+-+-+-+-+-+-+-+
|  Extensions ...
+-+-+-+-+-+-+—
```

Type: TDB

Counter: The number of source addresses present in the message

Lifetime: The number of seconds remaining before the subscription is considered expired. A lifetime of 0 indicates that a previous subscription will be cancelled.

Source Specific Multicast Address: indicates the source specific multicast address assigned by the mobile node's home agent.

Source Address 1 to n: the lest of source address associated with the channel.

Identification: A 64-bit number, constructed by the mobile node, used for matching multicast subscription requests with multicast subscription replies, and for protecting against replay attacks of registration messages.

Binding Update Message

Usage: The binding update message is sent by the home agent to a correspondent (or correspondent node) of a mobile node to inform or supply it with the current care-of address of the mobile node. This message is taken from the route optimization proposal in Route *Optimization in Mobile IP*, C. Perkins, P. Calhoun, IETF February 2000, work in progress. The care-of address can either be a regular care-of address as defined in Mobile IP [RFC2002] or it can be a source specific multicast address. If the care-of address is a source specific multicast address, the 'L' bit should be set.

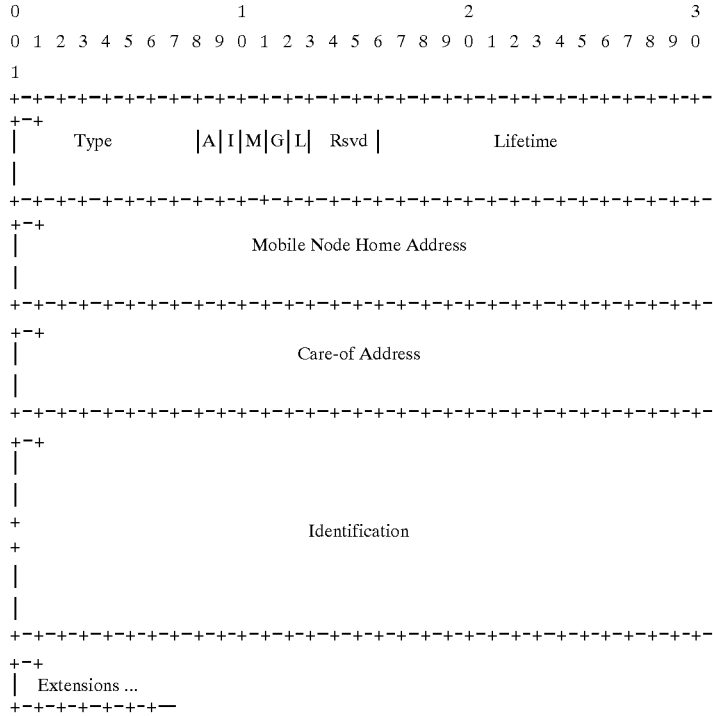

L: The 'L' bit specifies that the care-of address is a source specific multcast address.

Lifetime: The number of seconds remaining before the binding cache entry may be considered expired. The lifetime is typically equal to the remaining lifetime of the mobile node's registration. A value of all ones is not acceptable.

Source Update
  Usage: the home agent sends the source update message to the mobile node when the home Agent has received a binding acknowledgement from a correspondent node. The correspondent sends the binding acknowledgement after it has received a binding update message from the home agent. This message is an extension to the route optimization proposal in *Route Optimization in Mobile IP*, C. Perkins, P. Calhoun, IETF February 2000, work in progress.

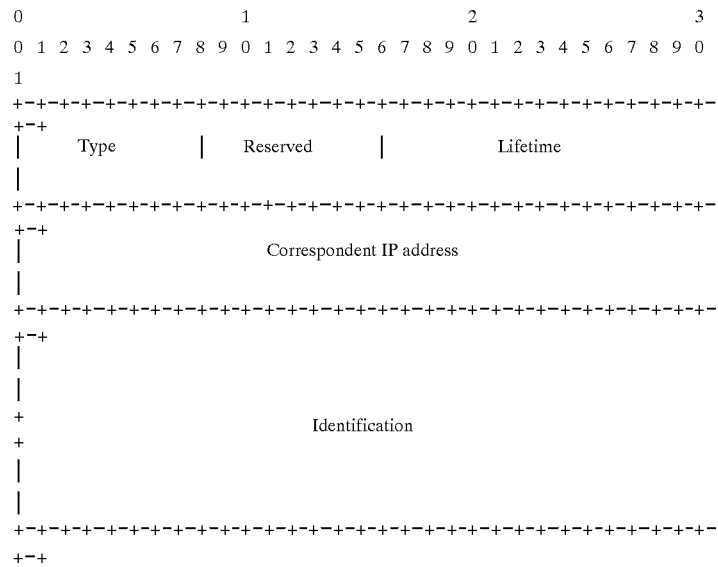

Type: TDP

Correspondent IP address: The IP address of a correspondent node to which the home agent has sent a binding update message in response to a binding request message.

Lifetime: The number of seconds remaining before the binding cache entry may be considered expired. The lifetime is typically equal to the remaining lifetime of the mobile node's registration. A value of all ones is not acceptable.

Identification: If present, a 64-bit number assigned by the node sending the source update message. It is used to assist in matching this message with the previous message sent to the originator of the message and in protecting against replay attacks.

Mobile Node Considerations

Receiving Agent Advertisement Message

When a mobile node 200 entering a foreign network 300, it receives a mobility agent advertisement extension (or agent advertisement message or agent advertisement or advertisement or advertisement message) in an ICMP router advertisement message sent from a foreign agent 330 as described in Mobile IP RFC2002. If the source specific multicast "L" bit is set, the agent advertisement message may include the following extension in this specific order:

Agent advertisement challenge extension as defined in *Mobile IP Challenge/Response Extensions*, C. Perkins, P. Calhoun, IETF February 2000, work in progress.

Network access identifier extension following the agent advertisement challenge extension.

The mobile node 200 uses the combination of the two messages (i.e. the agent advertisement and the network access identifier extension) to determine the action to take. If the mobile node 200 has a current binding (i.e. it has already registered with its home agent 240), the mobile node 200 uses the network access identifier to determine if it is evolving (or roaming) in the same domain. The FA-NAI should be in the form of FA_xx@wireless_domain.com. The mobile node 200 uses "wireless_domain.com" to identify if it is roaming in the same wireless domain, as this suffix is identical to all FAs 310 in the wireless domain.

Sending Registration Request

Figure 3:
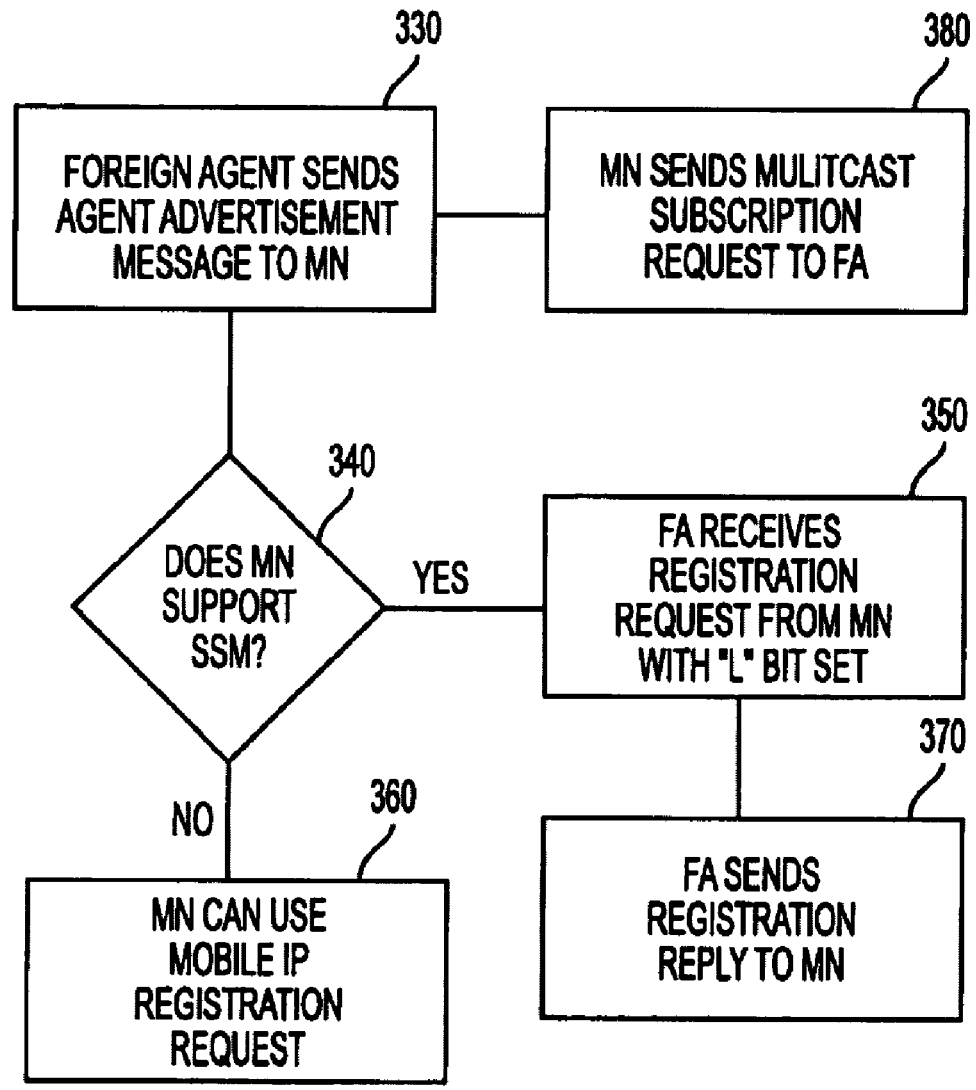
FIG. 3 is a flowchart illustrating mobile node considerations.

If the mobile node 200 determines that it needs to register with it home agent 240 (because it has entered a new foreign domain), the mobile node 200 sends a registration request to foreign agent 340. To do this, the mobile node 200 may follow the procedures defined in *Mobile IP Challenge/Response Extensions*, C. Perkins, P. Calhoun, IETF February 2000, work in progress. It is possible to configure the MN 200 to either support or not support SMM 340. Thus, two scenarios (or embodiments) are possible when sends a registration request to foreign agent 310 because the mobile 200 has entered a new foreign domain 300:

1. The mobile node 200 does support SSM (See FIG. 3): The mobile node 200 sends the registration request with the source specific multicast 'L' bit set. This request is sent to the foreign agent 350. The mobile node 200 may request its home agent 240 to not inform its correspondents of its current care-of address, in such case the mobile node sets the 'P' bit.

2. The mobile node 200 does not support SSM: In this case the MN 200 can use the Mobile IP registration request 360. In addition, the Mobile IP protocol as defined in [RFC 2002] is used.

Receiving Registration Reply

In a preferred embodiment, the protocols among different network entities are successful. Then the foreign agent 360 forwards the registration reply to the MN 200. If the registration reply contains a positive code, the MN 200 may verify that the message includes the following extension in this specific order:

Unsolicited MN-FA Key From AAA Subtype as defined in section 4 of *AAA Registration Keys for Mobile IP*, C. Perkins, P. Calhoun, IETF January 2000, work in progress.

source specific multicast address extension.

The mobile node 200 sends a multicast subscription request to the foreign agent 380 (if it is in the same foreign domain, but has a new foreign agent) to join the source specific multicast address channel (or channel) formed by associating the home agent address and the source specific multicast address contained in the source specific multicast address extension or address extension 380.

If the code is 89 it indicates that the foreign agent 310 does not support the SSM option. The mobile 200 should reattempt to register without setting the "L" bit in the registration request.

If the code is 2 or 3, the mobile node 200 may use the regular Mobile IP protocol as defined in [RFC2002].

In a preferred embodiment, the mobile node 200 can receive packets from any correspondent (or correspondent node 320). Each packet is intercepted by the home agent 240 and tunneled using the SSM address assigned for this mobile node 200. Upon reception of the packets forwarded by the FA 310, which in this specific embodiment acts as a source specific multicast router, the MN 200 de-tunnels the packets to obtain the original correspondent's datagram.

Sending Multicast Subscription Request

Figure 4:
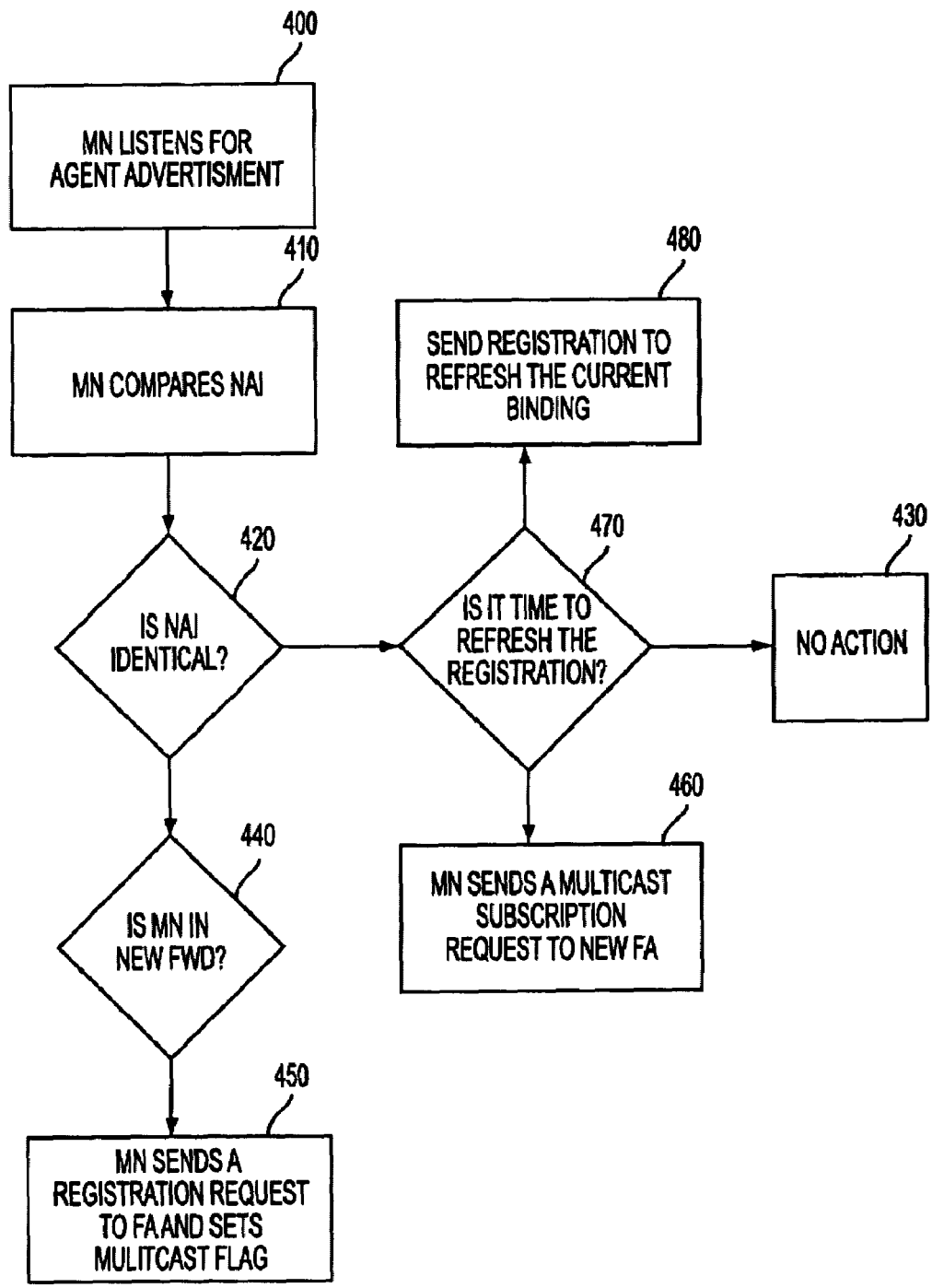
FIG. 4 is a flowchart illustrating the steps a mobile node takes when sending a request.

To be efficient and as quick as possible, the MN 200 should avoid going through the entire registration process. Thus, in a preferred embodiment, the mobile node 200 uses the network access identifier (NAI) extension appended to the agent advertisement message to determine that it is roaming within the same wireless domain (see FIG. 4). The MN 200 memorizes the NAI of the previous FA 310 (e.g. previous_FA@wireless_domain.com) and compares it to the new NAI received (e.g. new_FA@wireless_domain.com). If both NAI are identical, them the MN 200 determines that it is receiving an agent advertisement message from the same FA 310. Thus, no action is required.

If the MN 200 determines that the new FA 310 is different then the previous FA 310, but belongs to the same wireless domain (i.e. the suffix is identical; e.g. wireless_domain.com), then the MN 200 sends the multicast subscription request to the foreign agent 380. The mobile node 200 inserts (or appends) at least the home agent's 240 address to the multicast subscription request and should give the address of each correspondent that has received a binding update message from the home agent 240. The multicast subscription request may be immediately followed by a MN-FA authentication as defined in 3.5.3 of Mobile IP RFC2002. The value of the lifetime should not exceed the time remaining for the current registration. The mobile node 200 may send a multicast subscription request to the foreign agent 310 after having sent a binding warning message to the home agent 240. The multicast subscription request may include the correspondent node's 320 address for which the binding warning was sent.

Sending Binding Warning

The mobile node 200 may send a binding warning to its home agent 240 in order to inform the specified correspondent node 240 of its current care-of address. In a preferred embodiment, the mobile node 200 complies with the description proposed in *Route Optimization in Mobile IP*, C. Perkins, P. Calhoun, IETF February 2000, work in progress. After having sent a binding warning, the mobile node 200 may send a multicast subscription message to the foreign agent 310.

Receiving Source Update.

The mobile node 200 may choose to have its home agent 240 inform the correspondent node 320 of the current care-of address. The mobile node may then receive a source update from it home agent 240 informing the mobile node 200 that the correspondent 320 whose unicast address is given in the message has received a binding update message containing the source specific multicast address.

In addition, the mobile node 200 may verify that the lifetime field in the source update message does not have a value of all zeros. If it does, then mobile node 200 deletes an entry if one existed. Also, the mobile node 200 may verify that the source update message is protected with a MN-HA authentication message as defined in section 3.5.2 of mobile IP [RFC2002].

Foreign Agent Considerations

Configuration and Registration Table

Figure 5:
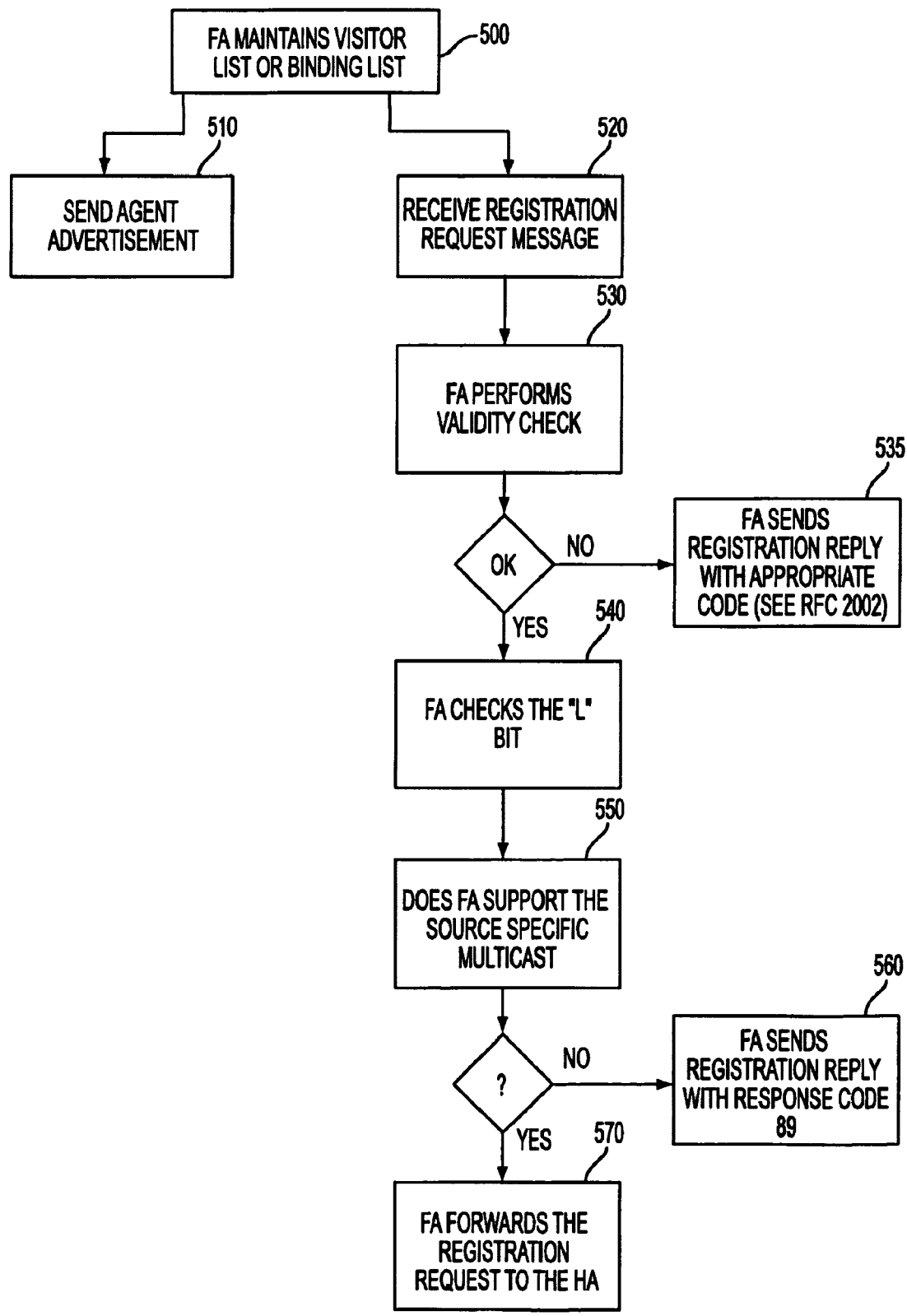
FIG. 5 is a flowchart illustrating home agent and foreign agent considerations.

In a preferred embodiment, the foreign agent 310 maintains a visitor list containing entries as described in section 3.7.1 of the mobile IP specification [RFC2002] 500 (see FIG. 5). The entries include the options present in the registration request, i.e., the mobile nodes's address, the home agent's address, the source specific multicast address, the lifetime and the remaining lifetime.

Sending Agent Advertisement

The foreign agent 310 supporting the simple multicast extension form Mobile IP [RFC2002] may set the 'L' bit (or source specific multicast bit or multicast bit) in all agent advertisement messages. The agent advertisement may be followed by an agent advertisement challenge extension as defined in Mobile IP Challenge/Response Extensions, C. Perkins, P. Calhoun, IETF February 2000, work in progress and may be followed by the FA-NAI extension defined infra. The rate at which the foreign agent sends agent advertisements is defined in Mobile IP [RFC2002].

Receiving Registration Request

The foreign agent 310 when receiving a registration request from a mobile node 520 may perform the validity checks 530 as described in section 3.7.2.1 of Mobile IP RFC2002. If the 'L' bit is set in the registration request 540, a foreign agent 310 will determine if it supports SMM 550. If it does not support SMM, it will return a registration reply to the mobile node 200 with the code field set to 89 (560). Otherwise, the foreign agent 310 will relay the registration request to the home agent 570.

Receiving Registration Reply from the Home Agent

The foreign agent 310 may hold the information included in the registration request to help the registration reply process. In a preferred embodiment, if the 'L' (or source specific multicast) bit was set in the registration request, the foreign agent will perform the following checks:

1. The registration reply's code is 0, the registration reply contains a source specific multicast address extension (or multicast address extension or address extension) appended by the home agent 240. Otherwise, the foreign agent 240 sends a registration reply with the code field set to 90 indicating that the source specific multicast address is not present in the registration reply.
2. If the registration code is either 2 or 3, the foreign agent 310 verifies the registration as described in section 3.7.3.1 of the Mobile IP specification [RFC2002].
3. For all other codes, the foreign agent 310 simply relays the registration request to the home agent 240.

Receiving Multicast Subscription Request

If the foreign agent 310 receives a multicast subscription request, the foreign agent 310 may verify that exactly one MN-FA authentication is present just after the multicast subscription request. Also, the foreign agent 310 may use the security parameter index present in the MN-FA to retrieve session key information. The wireless domain can implement this function via a secure database or have a KDC provide the information. In a preferred embodiment, the foreign agent 310 checks the authenticator value present in the MN-FA authentication.

If the result of the verification is positive, the foreign agent 310 may relay the traffic on all given channels. (A channel is form by associating the source specific multicast address to each source address found in the multicast subscription message or multicast subscription request or multicast request). If the foreign agent 310 receives a multicast subscription request with a lifetime equal to zero, the foreign agent may unsubscribe the list of channels given by the mobile node 200. The foreign agent 310 can keep track of the remaining time for each channel's subscription. If the lifetime expires before receiving a multicast subscription request for a specific channel, the foreign agent 310 may unsubscribe to the channel and stop forwarding packets for this channel.

Home Agent Considerations

Configuration and Registration Tables

Figure 6:
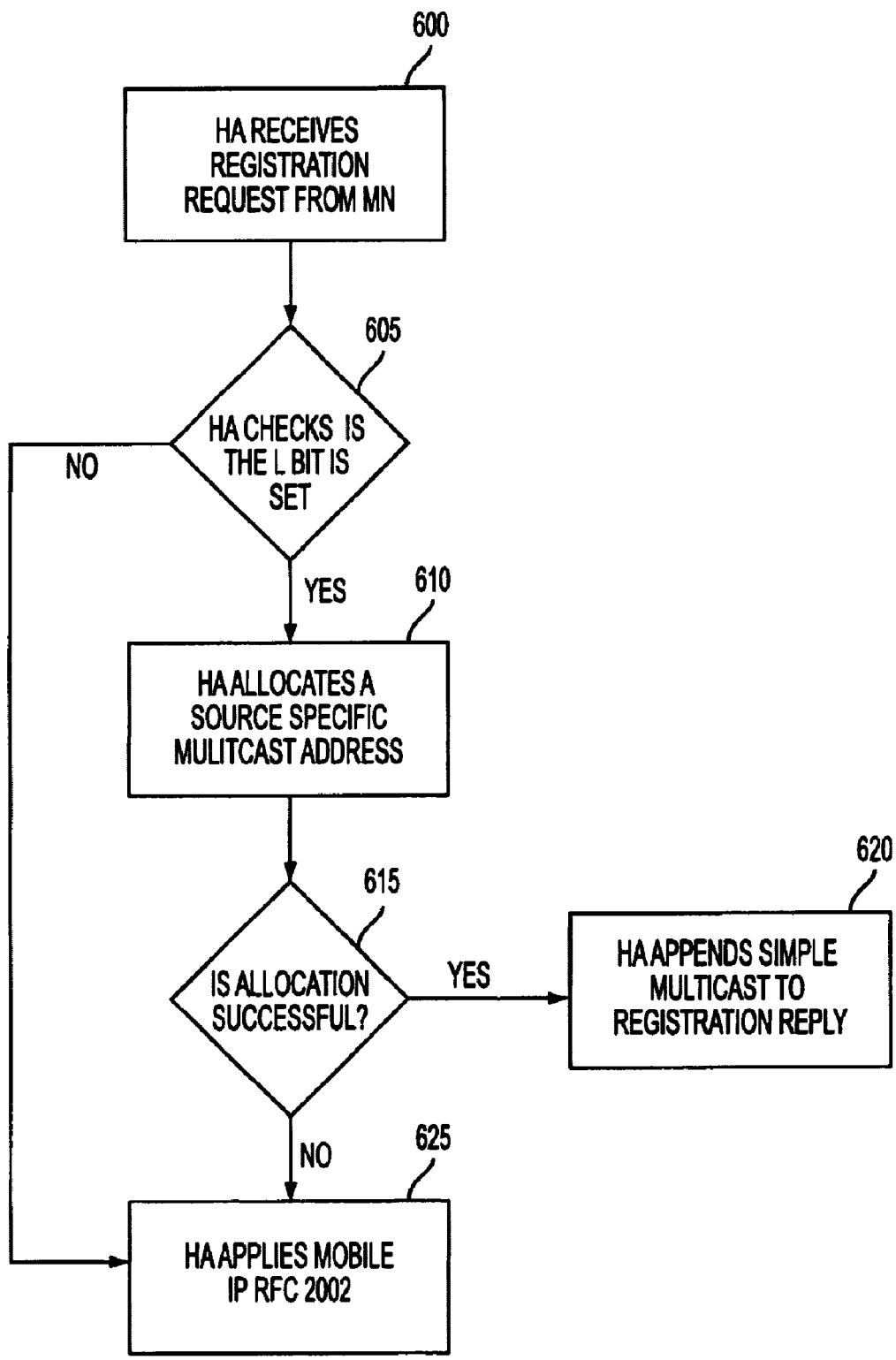
FIG. 6 is a flowchart illustrating home agent considerations.

FIG. 6 illustrates the home agent 240 implementing the SMM method. The home agent 240 is configured to serve a limited number of mobile nodes 200 with this service. When the home agent 240 implements the SMM method, the home agent 240 checks 605 if the mobile node 200 has requested source specific multicast service. If this is the case, home agent 240 allocates a source specific multicast address 610 to a mobile node 200. In addition, when the home agent accepts a valid registration request from a mobile node 200 that it serves as a home agent 240, the home agent 240 can create or modify the entry for this mobile node 200 in its mobility binding list (or binding list or cache). In a preferred embodiment, the entry includes:
the mobile node's 200 source specific multicast address;
the identification field from the registration reply; and
the remaining lifetime of the registration.

Receiving Registration Request

When the home agent 240 receives a registration request from a mobile node 600, it performs the validity checks as described in section 3.8.2.1 of the mobile IP specification [RFC2002]. In addition, in a preferred embodiment, the home agent 240 process all extensions present in the message before allocating the source specific multicast address to the mobile node 200. If the bit 'L' 605 is set in the registration request and the home agent implements the SMM protocol, the home agent 240 allocates a source specific multicast address to the MN 610. (See FIG. 6).

If the 'P' bit is set in the registration request, the home agent 240 is not authorized to transmit a binding update message containing the mobile node's 200 SSM address to the correspondents 240 of a mobile node 200. Also, the home agent 240 may comply with the protocol described in *Route optimization in Mobile IP*, C. Perkins, D. Johnson, IETF February 2000, work in progress, in which the mobile node's home agent 240 will send a binding update message with the care-of address set to 0. In addition, the lifetime is set to zero.

Sending Registration Reply

When sending a registration reply, the home agent 240 may apply the policy described in section 3.8.2.2. of mobile IP specification [RFC2002]. In a preferred embodiment, the home agent's 240 possible responses are listed below:

1. If the home agent 240 supports SSM service, and if the home agent 240 does succeed the SSM address allocation as indicated in the Mobile IP registration request 580, the registration reply code value will be set to 0. The source specific multicast address extension or address extension should be added (or appended) at the end of the registration reply 620 and the registration reply is then sent 595. The home agent 240 is in charge of allocating a source specific multicast address or multicast address. Since this multicast address is associated with the unique home agent IP address in the concept of channel, this pair is unique. Consequently, no special mechanism is needed to insure that the multicast address to be unique among different home agents 240.
2. If the home agent supports the SSM service, and if the home agent 240 does not succeed the Mobile IP "registration request" SSM address allocation, the CODE field should be set to value 3 (see infra) 590. In addition, the home agent 240 may apply Mobile IP [RFC2002].
3. If the home agent 240 does not support the SSM service, the CODE field should be set to value 2 (see infra) 590. From now on, Mobile IP [RFC2002] can be used.

When the registration is successful, the home agent 240 should be able to intercept the datagrams sent to the mobile node 200 and tunnel them using either the source specific multicast address or the care-of address, depending on the outcome of the registration request.

Sending Binding Update

In a preferred embodiment, the home agent 240 sends a binding update message (or binding update) to the mobile node's correspondent 320 in the following cases 710:

In response to a binding warning message sent by the mobile node 720.

In response to a binding request message sent by a correspondent 730.

In response to a binding warning message sent along with a registration request message (or registration request) 700.

Before sending a binding update, the home agent 240 should verify that it has received authorization from the mobile node 200 to do so. The home agent 240 may set the acknowledgement in the binding update message sent to the correspondent node 320 and include the identification field so as to have a mechanism to match the binding update and the binding acknowledgement messages.

Sending Source Update

The home agent 240 should send a source update message (or source update) to the mobile node 200 after receiving a binding acknowledgement (or binding acknowledgement message) from the correspondent node (or correspondent) 750. Also, the home agent 240 may set the lifetime field to indicate the remaining time of the mobile node's 200 registration. The home agent 240 may append a MN-HA authentication extension as defined in 3.5.2 of the Mobile IP specification [RFC2002].

Correspondent Node Considerations

Sending Binding Request

Figure 7:
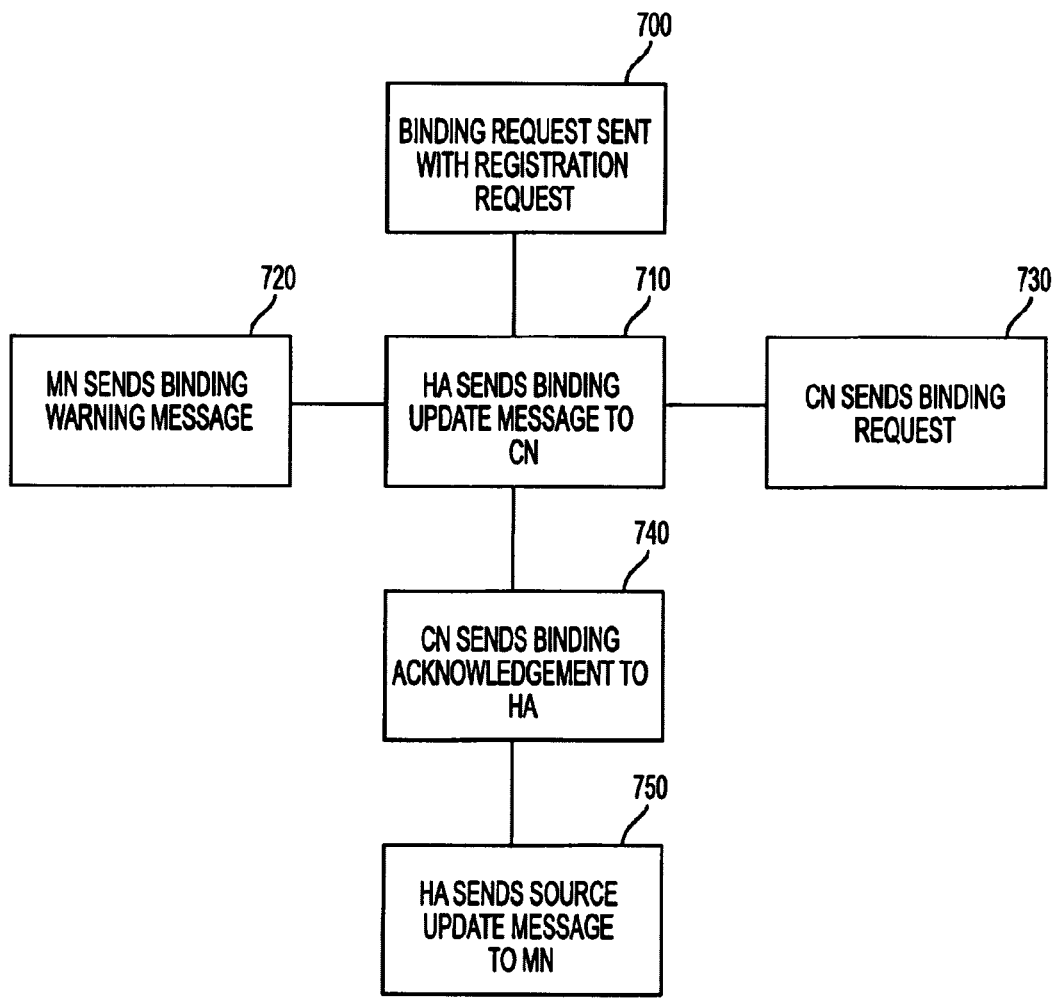
FIG. 7 is a flowchart illustrating home agent and correspondent node considerations.

A correspondent 320 may send a binding request is the current binding's lifetime is close to expiration 730. (See FIG. 7). The rules applied to this message are not related to the type of care-of address use by the mobile 200 (i.e. regular care-of address or source specific multicast address). The correspondent node may comply with the procedure described in *Route Optimization in Mobile IP*, C. Perkins, P. Calhoun, IETF February 2000, work in progress.

Receiving Binding Update

In a preferred embodiment, the correspondent (or correspondent node) 320 verifies that the 'A' and the 'L' bits are both set in the binding update message set by the mobile node's home agent 240. The correspondent node 320 also verifies that the 'I' bit is set in the message.

The correspondent node should first check that there is not another binding entry in its cache using the same source specific multicast address. If there is an entry with the same source specific multicast address, but for a different mobile node 200, the correspondent node 320 should not create an entry for the binding update message. If the correspondent node 320 creates an entry it can process the message as indicated in *Route Optimization in Mobile IP*, C. Perkins, P. Calhoun, IETF February 2000, work in progress.

Sending Binding Acknowledgement

The correspondent node 320 may send a binding acknowledgement to the mobile node's home agent 740.

Security Considerations

The Simple Multicast Extension for Mobile IP (SMM) creates extensions to the base protocol of mobile IP. In a preferred embodiment, it uses security mechanisms as defined in:

1. *Mobile IP Challenge/Response Extensions Mobile IP Challenge/Response Extensions*, C. Perkins, P. Calhoun, IETF February 2000, work in progress.
2. *AAA keys distribution AAA Registration Keys for Mobile IP*, C. Perkins, D. Johnson, IETF February 2000, work in progress.

Consequently, the base protocol of mobile IP is improved with enhanced security features. Mobile IP Challenge/Response Extensions and AAA keys distribution define how a mobile node can request usage of AAA (authorization, authentication and accounting) server services to authenticate the mobile node and to receive authorization from the network access provider to use its services.

While the invention has been disclosed in this patent application by reference to the details of preferred embodiments of the invention, it is to be understood that the disclosure is intended in an illustrative rather than in a limiting sense, as it is contemplated that modification will readily occur to those skilled in the art, within the spirit of the invention and the scope of the appended claims and their equivalents.

What is claimed is:

1. A method for multicasting internet protocol (IP) messages to mobile nodes in a wireless network having a home domain comprising a home agent and at least one foreign domain having a foreign agent, wherein each of the home and foreign domains further comprise a main access router attached to a plurality of base station routers, and wherein each base station router is connected to one or more base stations for communicating with mobile nodes in a coverage area of the base station router, comprising the steps of:

transmitting an agent advertisement message from a foreign agent in a foreign domain to be broadcast in the foreign domain, wherein the agent advertisement message includes a network access identifier extension that indicates a capability of the foreign agent to support source specific multicast services for multicasting IP messages;

receiving by a base station router in the foreign domain a mobile IP registration request from a mobile node entering the coverage area of the base station router, wherein the mobile IP registration request includes a request by the mobile node to access the foreign domain and a multicast flag to indicate a request for source specific multicast services;

in response to determining no registration of the mobile node in a binding cache of the base station router, performing the following steps:

appending an IP address of the base station router in a BSR extension to the mobile IP registration request;

transmitting by the base station router the mobile IP registration request with the BSR extension to the main access router in the foreign domain;

forwarding the mobile IP registration request from the main access router in the foreign domain to a home agent in a home domain of the mobile node;

if the home agent supports simple multicast extensions for multicasting IP messages, allocating a source specific multicast address to the mobile node and appending the source specific multicast address in a source specific multicast address extension to a mobile IP registration reply;

receiving by the base station router the mobile IP registration reply from the main access router, wherein the mobile IP registration reply includes the source specific multicast address-extension;

creating an entry in a binding cache of the base station router having information on the mobile node and assigned source specific multicast address extension; and forwarding the registration reply and source specific multicast address to the mobile node, wherein the mobile node then subscribes to the source specific multicast channel.

2. The method of claim 1, further comprising:

intercepting by the home agent a first IP message addressed to the mobile node from a correspondent node when the mobile node is in the foreign domain;

tunneling the first IP message into a second IP packet addressed to the source specific multicast address assigned to the mobile node;

forwarding the second IP packet by the foreign agent to the mobile node; and detunneling the second IP packet by the mobile node to read the first IP message.

3. The method of claim 2, further comprising:

transmitting a binding update message to a correspondent node of the mobile node, wherein the binding update message includes a care-of address for the mobile node;

receiving an acknowledgement from the correspondent node; and transmitting a source update message to the mobile node informing the mobile node that the correspondent node received a binding update message.

4. The method of claim 3, wherein the care-of address for the mobile node is the source specific multicast address assigned to the mobile node.

5. The method of claim 3, wherein the mobile IP registration request includes a field that can be set by the mobile node to request that the home agent keep its source specific multicast address private in any binding update messages.

6. The method of claim 5, wherein the care of address in the binding update message is an address of the home agent.

7. The method according to claim 3, wherein the home agent transmits said binding update message to the correspondent node in response to receiving a binding request message from the correspondent node.

8. The method according to claim 3, wherein the home agent transmits said binding update message to the correspondent node in response to receiving a binding warning message from the mobile node.

9. The method of claim 3, further comprising the steps of:

determining by the mobile node from the network access identifier extension to the agent advertisement message whether the mobile node has entered a new foreign domain with a new foreign agent; and transmitting the mobile IP registration request in response to entering a new foreign domain with a new foreign agent.

10. The method of claim 9, further comprising the steps of:

determining by the mobile node from the network access identifier extension to the agent advertisement message that the mobile node has not entered a new foreign domain but has entered into coverage area of a new foreign agent within the same foreign domain;

transmitting a multicast subscription request with an authentication extension to the new foreign agent in response to entering coverage area of the new foreign agent within the same foreign domain, wherein the multicast subscription request includes address of the home agent for the mobile node and address of each correspondent that has received a binding update message from the home agent.

11. The method of claim 10, further comprising the steps of:

in response to receiving a multicast subscription request from the mobile node, verifying the mobile node authentication by the foreign agent and retrieving session key information.

12. The method of claim 11, further comprising the steps of:

relaying traffic to the mobile node on the source specific multicast channels formed by associating the source specific multicast address of the mobile node to each correspondent address in the multicast subscription request.

13. A method for multicasting internet protocol (IP) messages to mobile nodes in a wireless network having a home domain comprising a home agent and at least one foreign domain having a foreign agent, wherein each of the home and foreign domains further comprise a main access router attached to a plurality of base station routers, and wherein each base station router is connected to one or more base stations for communicating with mobile nodes in a coverage area of the base station router, comprising the steps of:

transmitting an agent advertisement message from a foreign agent in a foreign domain to be broadcast in the foreign domain, wherein the agent advertisement message includes a network access identifier extension that includes a network access identifier of the foreign agent and capability of the foreign agent to support source specific multicast services for multicasting IP messages;

determining by the mobile node from the network access identifier extension to the agent advertisement message that the mobile node has entered a new foreign domain with a new foreign agent;

transmitting a mobile IP registration request in response to entering a new foreign domain with a new foreign agent, wherein the mobile IP registration request includes a request by the mobile node to access the foreign domain and a multicast flag to indicate a request for source specific multicast services;

alternatively, determining by the mobile node from the network access identifier extension to the agent advertisement message that the mobile node has not entered a new foreign domain but has entered into coverage area of a new foreign agent within the same foreign domain; and transmitting a multicast subscription request with an authentication extension to the new foreign agent in response to entering coverage area of the new foreign agent within the same foreign domain, wherein the multicast subscription request includes address of the home agent for the mobile node and address of each correspondent that has received a binding update message from the home agent.

14. The method of claim 13, wherein the step of determining by the mobile node from the network access identifier extension to the agent advertisement message that the mobile node has entered a new foreign domain with a new foreign agent, comprises the steps of:

comparing the network access identifier in the agent advertisement message with a network access identifier stored in memory from previously received agent advertisement messages; and determining that the network access identifiers are different.

15. The method of claim 14, wherein the step of determining by the mobile node from the network access identifier extension to the agent advertisement message that the mobile node has not entered a new foreign domain but has entered into coverage area of a new foreign agent within the same foreign domain, comprises the steps of:

comparing the network access identifier in the agent advertisement message with a network access identifier stored in memory from a previously received agent advertisement messages; and determining that the wireless domain addresses in the network access identifiers are the same but the foreign agent addresses are different.

16. The method of claim 15, further comprising the steps of:

alternatively, determining by the mobile node from the network access identifier extension to the agent advertisement message that the mobile node is in the same foreign domain under the coverage area of the same foreign agent; and performing no new registration.

17. The method of claim 16, further comprising the steps of:

in response to receiving a multicast subscription request from the mobile node entering coverage area of the new foreign agent within the same foreign domain, verifying authentication of the mobile node by the new foreign agent and retrieving session key information.

18. The method of claim 17, further comprising the steps of:

after verifying authentication of the mobile node entering coverage area of the new foreign agent within the same foreign domain, relaying IP messages to the mobile node on the source specific multicast channels formed by associating the source specific multicast address of the mobile node in the multicast subscription request to each correspondent address in the multicast subscription request.

* * * * *